(12) United States Patent
Li

(10) Patent No.: US 10,895,771 B2
(45) Date of Patent: Jan. 19, 2021

(54) ARRAY SUBSTRATE AND DISPLAY PANEL

(71) Applicants: HKC Corporation Limited, Guangdong (CN); Chongqing HKC Optoelectronics Technology Co., Ltd., Chongqing (CN)

(72) Inventor: Zeyao Li, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/290,955

(22) Filed: Mar. 3, 2019

(65) Prior Publication Data

US 2020/0103696 A1 Apr. 2, 2020

Related U.S. Application Data

(63) Continuation of application No. PCT/CN2018/116975, filed on Nov. 22, 2018.

(30) Foreign Application Priority Data

Sep. 30, 2018 (CN) .......................... 2018 1 1165415

(51) Int. Cl.
*G02F 1/1333* (2006.01)
*G09G 3/00* (2006.01)
*G02F 1/13* (2006.01)
*G02F 1/1362* (2006.01)

(52) U.S. Cl.
CPC ...... *G02F 1/133351* (2013.01); *G02F 1/1309* (2013.01); *G02F 1/136286* (2013.01); *G09G 3/006* (2013.01); *G02F 2001/136254* (2013.01)

(58) Field of Classification Search
CPC ............ G02F 1/133351; G02F 1/1309; G02F 2001/136254; G02F 1/136286; G09G 3/006
USPC ......................................................... 349/187
See application file for complete search history.

(56) References Cited

U.S. PATENT DOCUMENTS

2010/0163284 A1  7/2010  Tanahara

FOREIGN PATENT DOCUMENTS

| CN | 11308267 A | 11/2008 |
|----|------------|---------|
| CN | 101566765 A | 10/2009 |
| CN | 101592804 A | 12/2009 |
| CN | 101615368 A | 12/2009 |
| CN | 101566765 B | * 10/2011 |
| CN | 101308267 B | * 9/2013 |
| CN | 205507311 U | 8/2016 |

(Continued)

*Primary Examiner* — Nathanael R Briggs
*Assistant Examiner* — William D Peterson

(57) ABSTRACT

Disclosed are an array substrate and a display panel formed by cutting the array substrate. The array substrate includes a substrate body, a cutting line, a first test line, a second test line, and a first overline portion; the substrate body includes a plurality of display units and a cutting area located between the plurality of display units, and the cutting line is disposed in the cutting area; the first test line is disposed in the cutting area, extends along a routing direction of the cutting line, and includes a first bending portion; the first overline portion is located at an intersection of the second test line and the first bending portion, and the first overline portion is spaced apart from the cutting line.

18 Claims, 6 Drawing Sheets

(56) References Cited

FOREIGN PATENT DOCUMENTS

| | | | |
|---|---|---|---|
| CN | 107463038 | A | 12/2017 |
| JP | H01304744 | A | 12/1989 |
| JP | 04221926 | A | 8/1992 |
| JP | 3639649 | B2 | 4/2005 |
| KR | 20020014596 | A | 2/2002 |

\* cited by examiner

ARRAY SUBSTRATE AND DISPLAY PANEL

CROSS REFERENCE TO RELATED APPLICATIONS

The present application is a Continuation Application of PCT Application No. PCT/CN2018/116975 filed on Nov. 22, 2018, which claims the benefit of Chinese Patent Application No. 201811165415.9, entitled "ARRAY SUBSTRATE AND DISPLAY PANEL" filed on Sunday, Sep. 30, 2018, the disclosure of which is incorporated herein by reference in its entirety.

FIELD OF THE DISCLOSURE

The present disclosure relates to the field of display technologies, and in particular, to an array substrate and a display panel.

BACKGROUND OF THE DISCLOSURE

The statements herein merely provide background information related to the present application and do not necessarily constitute prior art. The liquid crystal display technology is widely used in the display of televisions, mobile phones and public information. Liquid crystal displays are flat and ultra-thin display devices, and the demand for the whole society is very large. In order to improve capacity and production efficiency, a plurality of display panels are generally produced on a large glass substrate, and the large glass substrate is divided into a plurality of individual display panels along a specific cutting line by a cutter wheel. Before cutting, it is necessary to do some testing or detection on the large glass substrate, so it is required to set up some test lines (conductive thin film circuits) on the large glass substrate to transmit electrical signals when testing or detecting the large glass substrate.

In an exemplary embodiment, these test lines are typically designed in a gap (cutting area) between a plurality of display panels, where there is inevitably an overline structure (i.e., test circuit crossings that transmit different signals). In order to prevent mutual interference between different electrical signals, different test circuits are insulated from each other by an insulating layer. However, when the cutter wheel performs cutting, since the cutter wheel will cut through the overline structure, it is easy to cause a short circuit between the two test circuits transmitting different electrical signals, thereby causing mutual interference between different signals.

SUMMARY OF THE DISCLOSURE

The main object of the present application is to propose an array substrate designed to avoid short circuits between two test circuits that transmit different electrical signals.

To achieve the above object, the array substrate provided by the present application includes:

a substrate body including a plurality of display units and a cutting area located between the plurality of display units;

a cutting line disposed in the cutting area;

a first test line disposed in the cutting area, extending along a routing direction of the cutting line, and including a first bending portion that protrudes laterally;

a second test line disposed in the cutting area. The second test line is disposed across the first test line and insulated from each other; and a first overline portion located at an intersection of the second test line and the first bending portion, and the first overline portion is spaced apart from the cutting line.

Optionally, the first test line includes a body segment extending along a routing direction of the cutting line, and the first bending portion is located at one side of the body segment and is connected to the body segment and the cutting line is located on the body segment.

Optionally, the first bending portion includes a first bending segment and a first connecting segment, and the first connecting portion connects the first bending segment with the body segment.

The second test line is disposed across the first bending segment and insulated from each other.

Optionally, an included angle between the first connecting segment and the first bending segment is greater than or equal to 90° and less than 180°.

Optionally, the first bending segment is parallel with the cutting line.

Optionally, the first bending segment is disposed at an included angle to the cutting line.

Optionally, the first bending portion is disposed in a U shape.

Optionally, the first test line includes a second bending portion that protrudes laterally; the array substrate further includes:

a third test line disposed in the cutting area. The third test line is disposed across the first test line and insulated from each other;

a second overline portion located at an intersection of the third test line and the second bending portion, and the second overline portion is spaced apart from the cutting line.

Optionally, the first overline portion and the second overline portion are located on the same side of the cutting line.

Optionally, the first overline portion and the second overline portion are located on opposite sides of the cutting line.

Optionally, the third test line and the first test line are located on layers of different heights of the array substrate, and are insulated from each other by an insulating functional layer.

Optionally, the spacing between the first overline portion and the cutting line is greater than or equal to 50 um.

Optionally, the plurality of display units are arranged in an array.

Optionally, the first test line and the second test line are both conductive thin film circuits integrated on the array substrate.

Optionally, the first test line and the second test line are located on layers of different heights of the substrate body, and are insulated from each other by an insulating functional layer.

The present application further proposes an array substrate, including:

a substrate body including a plurality of display units and a cutting area located between the plurality of display units;

a cutting line disposed in the cutting area;

a first test line disposed in the cutting area, extending along a routing direction of the cutting line, and including a first bending portion that protrudes laterally;

a second test line disposed in the cutting area. The second test line is disposed across the first test line and insulated from each other;

a first overline portion located at an intersection of the second test line and the first bending portion, and the first overline portion is spaced apart from the cutting line and the spacing between the first overline portion and the cutting line is greater than or equal to 50 um and less than or equal to 1000 um.

The present application also proposes a display panel. The display panel is formed by cutting an array substrate, including:

a substrate body including a plurality of display units and a cutting area located between the plurality of display units;

a cutting line disposed in the cutting area;

a first test line disposed in the cutting area, extending along a routing direction of the cutting line, and including a first bending portion that protrudes laterally;

a second test line disposed in the cutting area. The second test line is disposed across the first test line and insulated from each other; and a first overline portion located at an intersection of the second test line and the first bending portion, and the first overline portion is spaced apart from the cutting line.

Optionally, the first test line includes a body segment extending along a routing direction of the cutting line, and the first bending portion is located at one side of the body segment and is connected to the body segment and the cutting line is located on the body segment.

Optionally, the first test line includes a second bending portion that protrudes laterally; the array substrate further includes:

a third test line disposed in the cutting area. The third test line is disposed across the first test line and insulated from each other;

a second overline portion located at an intersection of the third test line and the second bending portion, and the second overline portion is spaced apart from the cutting line.

Optionally, the spacing between the first overline portion and the cutting line is greater than or equal to 50 um and less than or equal to 1000 um.

The technical schemes of the present application provides a plurality of display units and a cutting area between the plurality of display units on the substrate body, and provides a cutting line, a first test line, a second test line, and a first overline portion in the cutting area. The first test line extends along a routing direction of the cutting line, and includes a first bending portion. The second test line is disposed across the first test line and insulated from each other; the first overline portion is located at an intersection of the second test line and the first bending portion, and the first overline portion is spaced apart from the cutting line. In this way, when the cutter wheel cuts along the cutting line, the first overline portion can be avoided, so that a short circuit between the first test line and the second test line can be effectively prevented, so that the display panel formed by cutting the array substrate does not cause an abnormality in subsequent applications.

BRIEF DESCRIPTION OF THE DRAWINGS

In order to illustrate the technical schemes in the embodiments of the present application or in the exemplary art more clearly, the drawings which are required to be used in the description of the embodiments or the exemplary art are briefly described below. It is obvious that the drawings described below are only some embodiments of the present application. It is apparent to those of ordinary skill in the art that other drawings may be obtained based on the structures shown in accompanying drawings without inventive effort.

Figure 1:
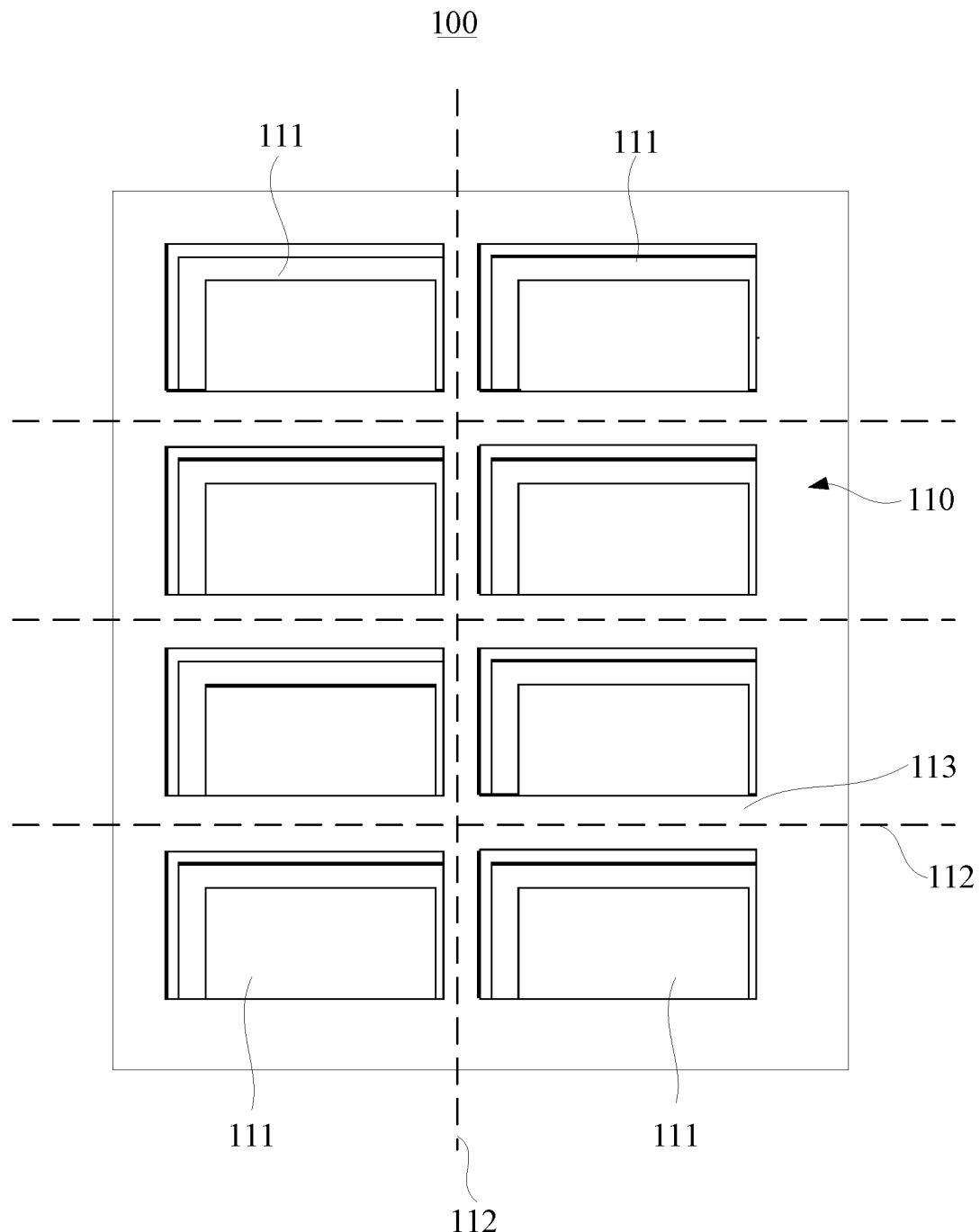
FIG. 1 is a structural schematic view of an array substrate of the present application.

The object realization, function characteristics and advantages of this application will be further described in reference to embodiments and accompanying drawings.

DETAILED DESCRIPTION OF THE EMBODIMENTS

The technical schemes of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure. All other embodiments obtained by persons of ordinary skill in the art based on the embodiments of the present disclosure without creative efforts shall fall within the scope of protection of the present disclosure.

It should be noted that, if there is a directional indication (such as up, down, left, right, front, back, . . . ) in the embodiments of the present application, the directional indication is only used to explain the relative positional relationship, the motion situation, etc. between the components in a certain posture (as shown in the drawings), and if the certain posture changes, the directional indication also changes accordingly.

In addition, if there is a description related to "first", "second", etc. in the embodiments of the present application, the description of the "first", "second", etc. is used for the purpose of description only, and is not to be construed as indicating or implying its relative importance or implicitly indicating the number of technical features indicated. Thus, features defined by "first" or "second" may include at least one of the features, either explicitly or implicitly. In addition, the meaning of "and/or" appearing throughout the text includes three parallel schemes, taking "A and/or B" as an example, including the A scheme, or the B scheme, or the scheme in which both A and B are simultaneously satisfied.

In addition, the technical schemes between the various embodiments may be combined with each other, provided that those skilled in the art can implement it, and when the combination of the technical schemes is contradictory or impossible to implement, it should be considered that the combination of these technical schemes does not exist, nor is it within the scope of protection required by this application.

The liquid display panel includes an array substrate, a color film substrate facing the array substrate, and a liquid crystal layer disposed between the array substrate and the color film substrate. When preparing a liquid crystal display panel, in order to increase capacity, a plurality of liquid crystal display panels are collectively fabricated on a large array substrate (large glass substrate), and then cut by a cutter wheel along a cutting line of the cutting region 113, and finally a separate liquid crystal display panel is obtained.

The present application proposes an array substrate. In general, an array substrate is fabricated by a multi-pass photolithography process, in which a multilayer functional film (such as an insulating functional film) and a conductive thin film are integrated. The conductive thin film exists in different shapes of circuits, and plays a role in transmitting electrical signals during the manufacture and use of the liquid crystal display panel. Among which, the conductive thin film circuit includes a first type of conductive thin film circuit and a second type of conductive thin film circuit. The first type of conductive thin film circuit is designed in each single-chip liquid crystal display panel for transmitting electrical signals for normal use of the liquid crystal display panel; the second type of conductive thin film circuit is designed in the gap between the plurality of liquid crystal display panels for transmitting electrical signals before the array substrate is cut to test or detect the array substrate.

Figure 2:
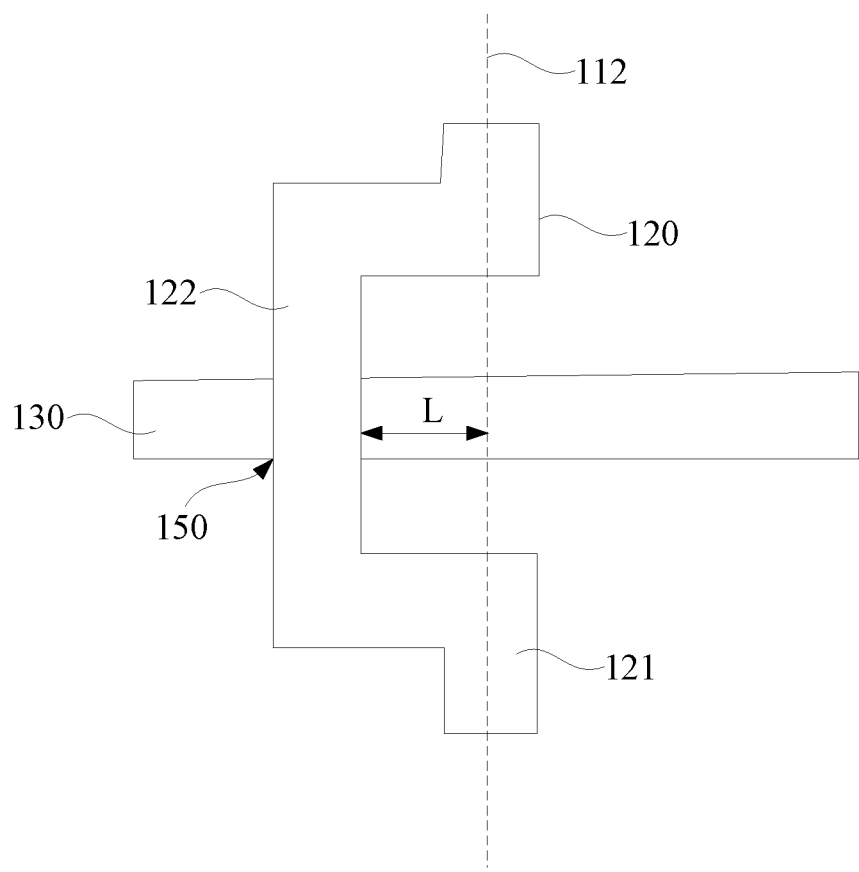
FIG. 2 is a schematic view showing a test circuit distribution of the first embodiment of the array substrate of FIG. 1.
Figure 3:
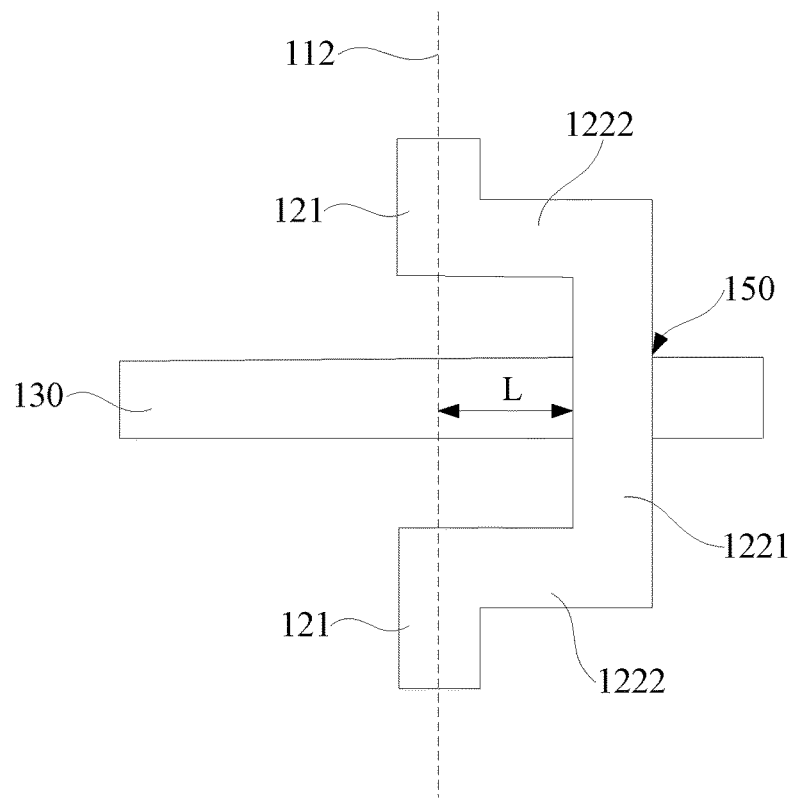
FIG. 3 is a schematic view showing a test circuit distribution of the second embodiment of the array substrate of FIG. 1.

Referring to FIGS. 1 to 3, an array substrate 100 proposed by the present application includes a substrate body 110, a cutting line 112, a first test line 120, a second test line 130, and a first overline portion 150. The cutting line 112 is disposed in the cutting area 113 for defining a cutting trajectory of the cutter wheel. The first test line 120 is disposed in the cutting area 113, the first test line 120 extends along a routing direction of the cutting line 112, and the first test line 120 includes a first bending segment 122 that protrudes laterally; the second test line 130 is disposed in the cutting area 113, the second test line 130 is disposed across the first test line 120 and insulated from each other. The first overline portion 150 is located at an intersection of the second test line 130 and the first bending portion 122, and the first overline portion 150 is spaced apart from the cutting line 112.

Figure 4:
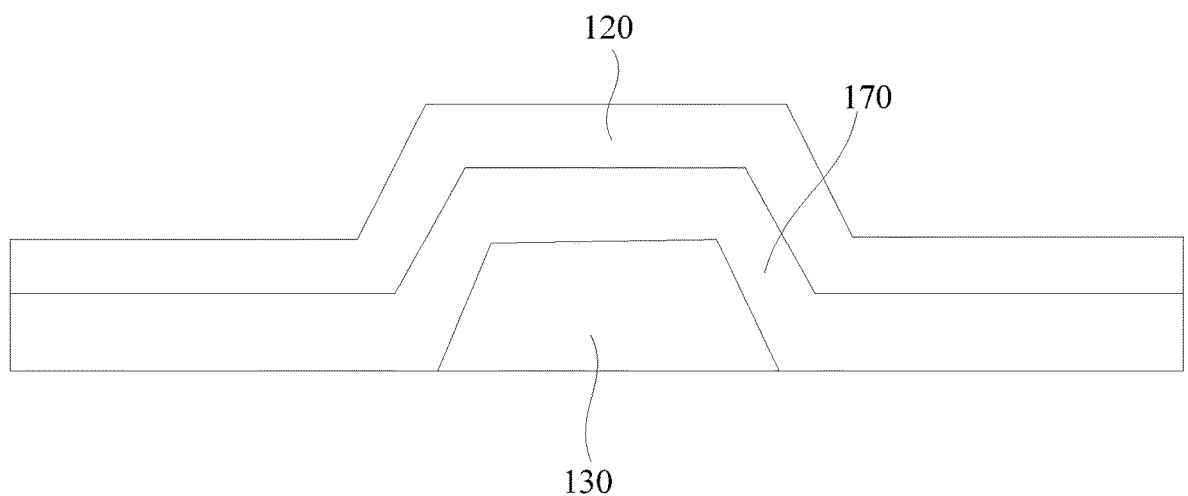
FIG. 4 is a schematic cross-sectional view of the first overline portion of FIGS. 2 and 3.

Specifically, a plurality of display units 111 on the substrate body 110 are arranged in an array, and a gap between a plurality of display units 111 forms a cutting area 113. A first test line 120 and a second test line 130 are disposed in the cutting area 113. The first test line 120 and the second test line 130 are conductive thin film circuits integrated on the array substrate 100. The first test line 120 and the second test line 130 are located on layers of different heights of the substrate body 110 respectively, and are insulated from each other by an insulating functional layer 170 (as shown in FIG. 4).

The cutting line 112 may extend in the lateral direction or the longitudinal direction. Without doubt, it may also extend in other directions, which is not specifically limited herein. The description will be made below by taking the cutting line 112 extending in the longitudinal direction as an example. Among which, the positional relationship between the cutting line 112 and the first test line 120 includes two types. first, the cutting line 112 is located on the first test line 120, that is, the cutting line 112 can cut the first test line 120; second, the cutting line 112 is located on one side of the first test line 120, that is, the cutting line 112 does not cut the first test line 120. Given that if the cutting line 112 is located on one side of the first test line 120, the required cutting area 113 is large, resulting in a larger size of the array substrate 100, so that a cutting line 112 can be disposed on the first test line 120 in order to save the area of the cutting area 113.

The first test line 120 includes a first bending portion 122 that protrudes laterally, wherein the first bending portion 122 may be located on the left side or the right side of the first test line 120. The structure of the first bending portion 122 may be various. For example, the first bending portion 122 may be substantially a V-shaped structure, a U-shaped structure or other irregular structure, etc., which is not specifically limited here, and will be described in detail below. Herein, it should be noted that the intersection of the second test line 130 and the first bending portion 122 means that the second test line 130 is intersected with the projection of the first bending portion 122 in the plane of the substrate body 110, that is, an overline portion is formed between the second test line 130 and the first bending portion 122. For convenience of description, the overline portion formed between the second test line 130 and the first bending portion 122 is defined as the first overline portion 150.

The first overline portion 150 is spaced apart from the cutting line 112, that is, the cutting line 112 does not pass through the first overline portion 150. Thus, when the cutter wheel cuts along the cutting line 112, the first overline portion 150 will be avoided, so that a short circuit between the first test line 120 and the second test line 130 can be effectively prevented. Herein, it should be noted that when the cutter wheel performs cutting, if the cutter wheel cuts through the first overline portion 150, a short circuit occurs due to the lap joint between the conductive thin film of the first test line 120 and that of the second test line 130 due to the ductility of the metal conductive thin film. Therefore, a short circuit between the first test line 120 and the second test line 130 can be prevented by causing the first overline portion 150 to be located on one side of the cutting line 112.

The technical schemes of the present application provides a plurality of display units 111 and a cutting area 113 between the plurality of display units 111 on the substrate body 110, and provides a cutting line 112, a first test line 120, and a second test line 130 in the cutting area 113. The first test line 120 extends along a routing direction of the cutting line 112, and the first test line 120 includes a first bending portion 122 that protrudes laterally. The second test line 130 is insulated from the first test line 120 and the second test line 130 is disposed across the first bending portion 122 to form a first overline portion 150. The first overline portion 150 is spaced apart from the cutting line 112. In this way, when the cutter wheel cuts along the cutting line 112, the first overline portion 150 can be avoided, so that a short circuit between the first test line 120 and the second test line 130 can be effectively prevented, so that the display panel 100 formed by cutting the array substrate is not abnormal during subsequent applications, and the yield of the display panel is improved.

Referring to FIG. 2, the first test line 120 includes a body segment 121. The body segment 121 extends along a routing direction of the cutting line 112, and the first bending portion 122 is located at one side of the body segment 121 and is connected to the body segment 121 and the cutting line 112 is located on the body segment 121. Thus, there is a certain spacing between the first overline portion 150 and the body segment 121. When the cutter wheel cuts along the cutting line 112, even if the cutter wheel slightly deviates from the cutting line 112, there is also no case where the first overline portion 150 gets cut.

Specifically, referring to FIG. 3, the first bending portion 122 includes a first bending portion 1221 and a first connecting portion 1222, and the first connecting portion 1222 connects the first bending portion 1221 with the body segment 121, and the second test line 130 is disposed across the first bending portion 1221 to form a first overline portion 150 Among which, the first bending portion 1221 may be parallel to the cutting line 112. Without doubt, the first bending portion 1221 may also be disposed at an included angle to the cutting line 112.

Figure 5:
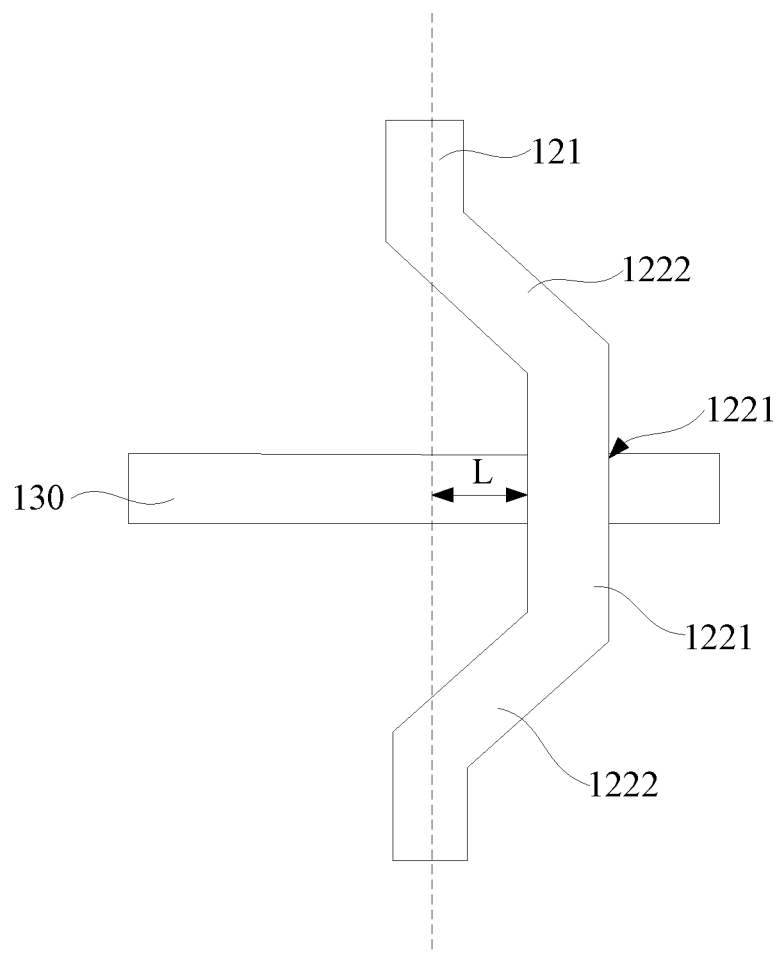
FIG. 5 is a schematic view showing a test circuit distribution of the third embodiment of the array substrate of FIG. 1.

Referring to FIGS. 3 and 5, an included angle between the first connecting segment 1222 and the first bending segment 1221 is greater than or equal to 90° and less than 180°.

Figure 6:
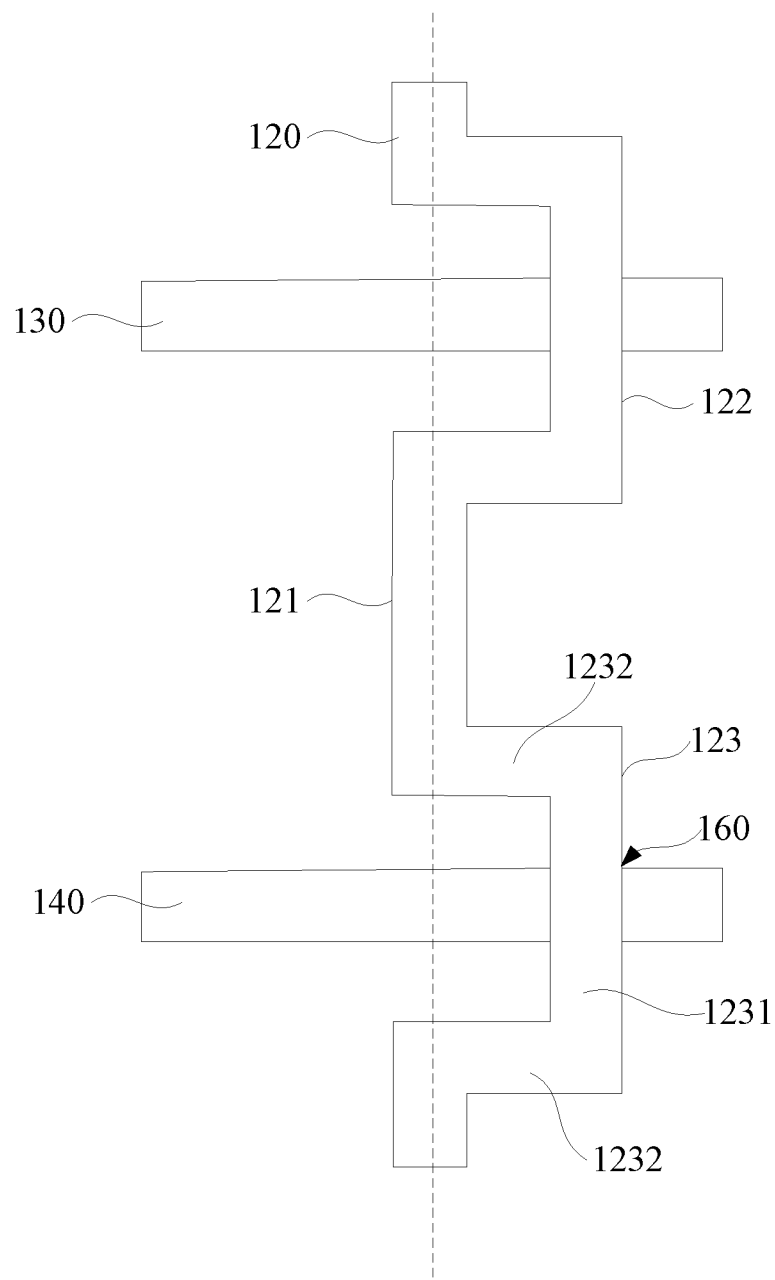
FIG. 6 is a schematic view showing a test circuit distribution of the fourth embodiment of the array substrate of FIG. 1.

On the basis of the above embodiments, referring to FIG. 6, the first test line 120 further includes a second bending portion 123 that protrudes laterally. Among which, the second bending portion 123 and the first bending portion 122 are located on the same side (left side or right side) of the first test line 120, or the second bending portion 123 and the first bending portion 122 are respectively located at two sides of the first test line 120.

The array substrate 100 further includes a third test line 140 and a second overline portion 160. The third test line 140 is disposed in the cutting area 113, the third test line 140 is disposed across the first test line 120 and insulated from each other, and the second overline portion 160 is located at an intersection of the third test line 140 and the second bending portion 123, and the second overline portion 160 is spaced apart from the cutting line 112. As such, when the cutter wheel cuts along the cutting line 112, since the first overline portion 150 and the second overline portion 160 are not cut, a short circuit between the first test line 120 and the second test line 130 and the third test line 140 can be avoided, while a short circuit between the second test line 130 and the third test line 140 can be avoided, thereby improving the yield of the display panel cut and formed by the array substrate 100.

Figure 7:
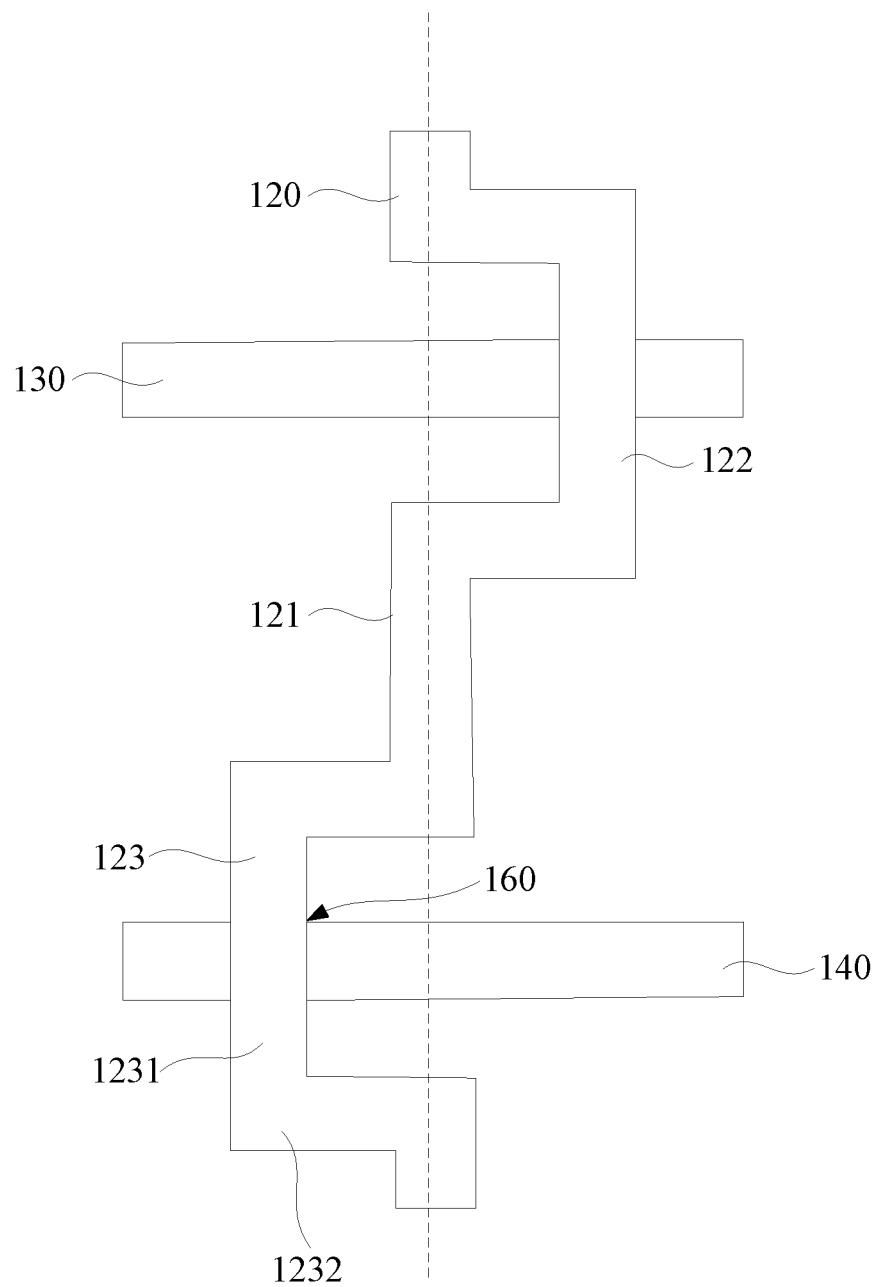
FIG. 7 is a schematic view showing a test circuit distribution of the fifth embodiment of the array substrate of FIG. 1.

Specifically, the third test line 140 extends in the lateral direction. The third test line 140 and the first test line 120 are located on layers of different heights of the array substrate 100, and are insulated from each other by an insulating functional layer 170. Herein, the intersection of the third test line 140 and the second bending portion 123 means that the third test line 140 is intersected with the projection of the first bending portion 123 in the plane of the substrate body 110, that is, an overline portion is formed between the second test line 140 and the first bending portion 123. For convenience of description, the overline portion formed between the third test line 140 and the second bending portion 123 is defined as the second overline portion 160. Among which, the second overline portion 160 and the first overline portion 150 are located on the same side of the cutting line 112 (as shown in FIG. 6); or, the second overline portion 160 and the first overline portion 150 are respectively located on opposite sides of the cutting line 112 (as shown in FIG. 7).

Referring to FIG. 2 again, on the basis of the above embodiments, in order to ensure that the cutter wheel cuts along the cutting line 112, even if the cutter wheel slightly deviates from the cutting line 112, the first overline portion 150 is not cut, so that the spacing L between the first overline portion 150 and the cutting line 112 may be made greater than or equal to 50 um. Herein, it should be noted that since the first test line 120 has a certain width, the spacing L between the first overline portion 150 and the cutting line 112 means the spacing between the first overline portion 150 close to the sides of the cutting line 112 and the cutting line 112. Similarly, the spacing L between the second overline portion 160 and the cutting line 112 may be equal to or greater than 50 um.

Given that if the spacing L between the first overline portion 150 and the cutting line 112 is too large, the area of the cutting region 113 to be occupied is large, thereby causing a large area of the array substrate 100, which reduces the space utilization of the array substrate 100. Therefore, in order to reduce the area of the array substrate 100 under the premise that the cutter wheel wouldn't cut to first overline portion 150, the spacing between the first overline portion 150 and the cutting line 112 may be greater than or equal to 50 um and less than or equal to 1000 um. Similarly, the spacing between the second overline portion 160 and the cutting line 112 may be greater than or equal to 50 um and less than or equal to 1000 um.

The present application also proposes a display panel, which is formed by cutting an array substrate 100. The specific structure of the array substrate 100 can be understood with reference to the foregoing embodiments. Since the array substrate 100 adopts all the technical schemes of all the above embodiments, it has at least all the effects brought about by the technical schemes of the above embodiments, and details are not described herein again.

The embodiments above are merely some embodiments of the present disclosure but are not to be construed as limiting the scope of the present disclosure, and any equivalent structural conversion devised based on the inventive concept of the present disclosure or using the drawing of the present disclosure, or a direct or indirect application of the present disclosure to another related technical field shall fall into the scope of protection of the present disclosure.

What is claimed is:

1. An array substrate, comprising:
   a substrate body comprising a plurality of display units and a cutting area located between the plurality of display units;
   a cutting line disposed in the cutting area;
   a first test line disposed in the cutting area, extending along a routing direction of the cutting line, and including a first bending portion that protrudes laterally;
   a second test line disposed in the cutting area, the second test line is disposed across the first test line and insulated from each other; and
   a first overline portion located at an intersection of the second test line and the first bending portion, and the first overline portion is spaced apart from the cutting line
   wherein the spacing between the first overline portion and the cutting line is greater than or equal to 50 um.

2. The array substrate according to claim 1, wherein the first test line comprises a body segment extending along a routing direction of the cutting line, and the first bending portion is located at one side of the body segment and is connected to the body segment and the cutting line is located on the body segment.

3. The array substrate according to claim 2, wherein the first bending portion includes a first bending segment and a first connecting segment, and the first connecting portion connects the first bending segment with the body segment; the second test line is disposed across the first bending segment and insulated from each other.

4. The array substrate according to claim 3, wherein an included angle between the first connecting segment and the first bending segment is greater than or equal to 90° and less than 180°.

5. The array substrate according to claim 3, wherein the first bending segment is parallel with the cutting line.

6. The array substrate according to claim 3, wherein the first bending segment is disposed at an included angle to the cutting line.

7. The array substrate according to claim 1, wherein the first bending segment is disposed in a U shape.

8. The array substrate according to claim 1, wherein the first test line comprises a second bending portion that protrudes laterally; the array substrate further comprises:
    a third test line disposed in the cutting area, the third test line is disposed across the first test line and insulated from each other;
    a second overline portion located at an intersection of the third test line and the second bending portion, and the second overline portion is spaced apart from the cutting line.

9. The array substrate according to claim 8, wherein the first overline portion and the second overline portion are located on the same side of the cutting line.

10. The array substrate according to claim 8, wherein the first overline portion and the second overline portion are located on opposite sides of the cutting line.

11. The array substrate according to claim 8, wherein the third test line and the first test line are located on layers of different heights of the array substrate, and are insulated from each other by an insulating functional layer.

12. The display panel according to claim 1, wherein the plurality of display units are arranged in an array.

13. The display panel according to claim 1, wherein the first test line and the second test line are both conductive thin film circuits integrated on the array substrate.

14. The display panel according to claim 1, wherein the first test line and the second test line are located on layers of different heights of the substrate body, and are insulated from each other by an insulating functional layer.

15. An array substrate, comprising:
    a substrate body comprising a plurality of display units and a cutting area located between the plurality of display units;
    a cutting line disposed in the cutting area;
    a first test line disposed in the cutting area, extending along a routing direction of the cutting line, and including a first bending portion that protrudes laterally;
    a second test line disposed in the cutting area, the second test line is disposed across the first test line and insulated from each other; and
    a first overline portion located at an intersection of the second test line and the first bending portion, and the first overline portion is spaced apart from the cutting line and the spacing between the first overline portion and the cutting line is greater than or equal to 50 um and less than or equal to 1000 um.

16. A display panel, wherein the display panel is formed by cutting an array substrate, comprising:
    a substrate body comprising a plurality of display units and a cutting area located between the plurality of display units;
    a cutting line disposed in the cutting area;
    a first test line disposed in the cutting area, extending along a routing direction of the cutting line, and including a first bending portion that protrudes laterally;
    a second test line disposed in the cutting area, the second test line is disposed across the first test line and insulated from each other; and
    a first overline portion located at an intersection of the second test line and the first bending portion, and the first overline portion is spaced apart from the cutting line
    wherein the spacing between the first overline portion and the cutting line is greater than or equal to 50 um and less than or equal to 1000 um.

17. The display panel according to claim 16, wherein the first test line comprises a body segment extending along a routing direction of the cutting line, and the first bending portion is located at one side of the body segment and is connected to the body segment and the cutting line is located on the body segment.

18. The display panel according to claim 16, wherein the first test line comprises a second bending portion that protrudes laterally; the array substrate further comprises:
    a third test line disposed in the cutting area, the third test line is disposed across the first test line and insulated from each other;
    a second overline portion located at an intersection of the third test line and the second bending portion, and the second overline portion is spaced apart from the cutting line.

\* \* \* \* \*